US012479698B2

United States Patent
Saarelainen et al.

(10) Patent No.: US 12,479,698 B2
(45) Date of Patent: Nov. 25, 2025

(54) ARRANGEMENT FOR DETECTING BEARING FAILURES IN ELEVATOR

(71) Applicant: KONE Corporation, Helsinki (FI)

(72) Inventors: Antti Saarelainen, Helsinki (FI); Henri Wenlin, Helsinki (FI); Pasi Lehtimäki, Helsinki (FI); Janne Rossi, Helsinki (FI)

(73) Assignee: KONE Corporation, Helsinki (FI)

( * ) Notice: Subject to any disclaimer, the term of this patent is extended or adjusted under 35 U.S.C. 154(b) by 1260 days.

(21) Appl. No.: 17/231,496

(22) Filed: Apr. 15, 2021

(65) Prior Publication Data
US 2021/0229953 A1 Jul. 29, 2021

Related U.S. Application Data

(63) Continuation of application No. PCT/FI2018/050800, filed on Nov. 2, 2018.

(51) Int. Cl.
*B66B 5/00* (2006.01)
*B66B 1/34* (2006.01)
*B66B 9/00* (2006.01)
*B66B 11/04* (2006.01)
(Continued)

(52) U.S. Cl.
CPC .......... *B66B 5/0025* (2013.01); *B66B 1/3461* (2013.01); *G01M 13/045* (2013.01); *B66B 9/00* (2013.01); *B66B 11/043* (2013.01); *B66B 15/02* (2013.01); *F16C 2233/00* (2013.01); *F16C 2326/00* (2013.01)

(58) Field of Classification Search
CPC ....... B66B 5/0025; B66B 1/3461; B66B 9/00; B66B 11/043; G01M 13/045; F16C 2233/00; F16C 2326/00

USPC .......................................................... 187/393
See application file for complete search history.

(56) References Cited

U.S. PATENT DOCUMENTS

| 2014/0027209 A1* | 1/2014 | Kallioniemi | B66B 5/0025 |
| | | | 187/391 |
| 2021/0229953 A1* | 7/2021 | Saarelainen | G01M 13/04 |
| 2021/0371245 A1* | 12/2021 | Liebetrau | B66B 7/1246 |

FOREIGN PATENT DOCUMENTS

| CN | 105819295 A | * | 8/2016 | ........... B66B 5/0025 |
| CN | 108238527 B | * | 11/2019 | ........... B66B 7/1207 |
| EP | 2604564 A1 | * | 6/2013 | ............... B66B 3/00 |

(Continued)

OTHER PUBLICATIONS

International Search Report for PCT/FI2018/050800 mailed on Mar. 25, 2019.

(Continued)

*Primary Examiner* — Christina M Schreiber
(74) *Attorney, Agent, or Firm* — Birch, Stewart, Kolasch & Birch, LLP

(57) ABSTRACT

An arrangement for detecting bearing failures in an elevator system, which elevator system includes a hoisting machinery with a traction sheave on a rotary shaft, an elevator car, a counterweight and a hoisting element connected between the car and the counterweight and arranged to be moved by the a rotation of the traction sheave, and which arrangement includes at least a motion sensor for measuring rotation of the hoisting motor. The arrangement includes a signal processing unit connected to the motion sensor and arranged to process vibration signals originated in the bearings of the elevator system.

15 Claims, 3 Drawing Sheets

(51) Int. Cl.
*B66B 15/02* (2006.01)
*G01M 13/045* (2019.01)

(56) References Cited

FOREIGN PATENT DOCUMENTS

| JP | 2008292288 A | * | 12/2008 | |
|---|---|---|---|---|
| JP | 2012184045 A | * | 9/2012 | |
| WO | WO-2017072172 A1 | * | 5/2017 | ........... B66B 5/0025 |
| WO | WO-2017080065 A1 | * | 5/2017 | ............ G01M 13/00 |

OTHER PUBLICATIONS

Written Opinion of the International Searching Authority for PCT/FI2018/050800 mailed on Mar. 25, 2019.

* cited by examiner

ARRANGEMENT FOR DETECTING BEARING FAILURES IN ELEVATOR

CROSS REFERENCE TO RELATED APPLICATION

This application is a Continuation of PCT International Application No. PCT/FI2018/050800, filed on Nov. 2, 2018, which is hereby expressly incorporated by reference into the present application.

BACKGROUND OF THE INVENTION

The present invention relates to an arrangement as defined in the preamble of claim 1 and claim 8 for detecting bearing failures in an elevator.

Elevators that are suspended via diverter pulleys comprise usually several bearings in various parts of the elevator. In that case the elevator car can comprise one or more diverter pulleys and also the counterweight can comprise one or more diverter pulleys. Usually all the diverter pulleys have bearings. In addition, the hoisting machinery has rotary elements, for instance a traction sheave whose rotating shaft also has bearings. The bearings are wearing components and therefore their condition must be followed. If the condition of the bearings is not followed it may happen that a sudden bearing failure stops, for example, a diverter pulley during the run of the elevator. That may cause poor ride comfort and also damages to the elevator equipment.

A bearing failure, particularly in its early stage, may also cause irritating noise that disturbs passengers and other people in the building.

Recognizing early bearing failures in an elevator has been extremely challenging, specially if the bearing failure takes place in some of the diverter pulleys of the counterweight or elevator car.

Due to the challenging task mentioned above the condition of the bearings in an elevator has not been followed continuously in the prior art technology. Some of the failures have become aware only via complaints by customers and in some cases maintenance personnel has spotted bearing failures in connection with their other maintenance work. Usually irritating noise is a first indication of the bearing failures that is noticed. Often, special separate tools must be used to find the failing or failed bearings.

SUMMARY OF THE INVENTION

One object of the present invention is to eliminate drawbacks of prior art technology and to achieve an effective and reliable arrangement for detecting bearing failures in an elevator. The arrangement according to the invention is characterized by what is disclosed in the characterization parts of claim 1 and claim 8. Other embodiments of the invention are characterized by what is disclosed in the other claims.

A task of the invention is to provide an early detection of bearing failures.

The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise, the different details presented in connection with each embodiment can also be applied in other embodiments. In addition, it can be stated that at least some of the subordinate claims can, in at least some situations, be deemed to be inventive in their own right.

An aspect of the invention is to provide an arrangement for detecting bearing failures in an elevator, which elevator comprises at least an elevator control unit, a hoisting machinery with a hoisting motor, a traction sheave on a rotary shaft, an elevator car, a counterweight and a hoisting element connected between the car and the counterweight and arranged to be moved by the rotation of the traction sheave, and which arrangement comprises at least a motion sensor for detecting rotation of the hoisting motor.

A further or alternate aspect of the invention is to detect and/or identify, which bearing of the hoisting machinery or which bearing of the diverting pulleys may failure soon or is damaged.

Advantageously the arrangement comprises a signal processing unit that is connected to the motion sensor and arranged to process vibration signals originated in the bearings of the elevator system. An advantageous motion sensor is a rotary encoder, although also other types of motion sensors could be used.

Another advantageous arrangement according to the invention comprises a signal processing unit that is connected to the motion sensor which both are locally placed in the hoisting machinery and arranged to identify and process vibration signals originated in the bearings of the elevator system.

In a further advantageous embodiment of the invention, the measured raw vibration data or partially processed vibration data is sent for further processing to a signal processing unit that is outside the elevator. In that case, for example, the more requiring analytics can be done as a cloud computing process.

All in all, according to the invention the measured and detected vibration signals are processed by the signal processing unit that can be either a hardware or software com-ponent, or both combined together. Preferably, the signal processing unit or a corresponding unit is placed in a motion sensor, in the hoisting machinery, somewhere else in the elevator, or even remotely placed into a cloud server outside the elevator as mentioned above. Advantageously, the measured vibration data is transmitted for further processing in a data bus as raw data or partially processed vibration data.

In an advantageous embodiment of the invention, anomalies in bearing vibrations of a bearing are recognized and the early detection of a bearing failure is deduced.

One advantage of the invention is that the failing bearings can be found before the total failure. Other advantages are a possibility of a preventive maintenance and shorter elevator downtimes for customers. Yet another advantage is a more effective use of the maintenance personnel due to more accu-rate preliminary information about the failing or failed bearings. And also one advantage is a cost effective way of following the condition of the bearings and finding the failing or failed bearings because additional measuring equipments are not needed.

BRIEF DESCRIPTION OF THE DRAWINGS

In the following, the invention will be described in detail by the aid of example embodiments by referring to the attached simplified and diagrammatic drawings, wherein.

DETAILED DESCRIPTION OF THE INVENTION

Elevators where the arrangement according to the invention can be used are advantageously traction sheave elevators where the elevator car and counterweight are moved by a hoisting machinery equipped with a rotating traction sheave.

Figure 1:
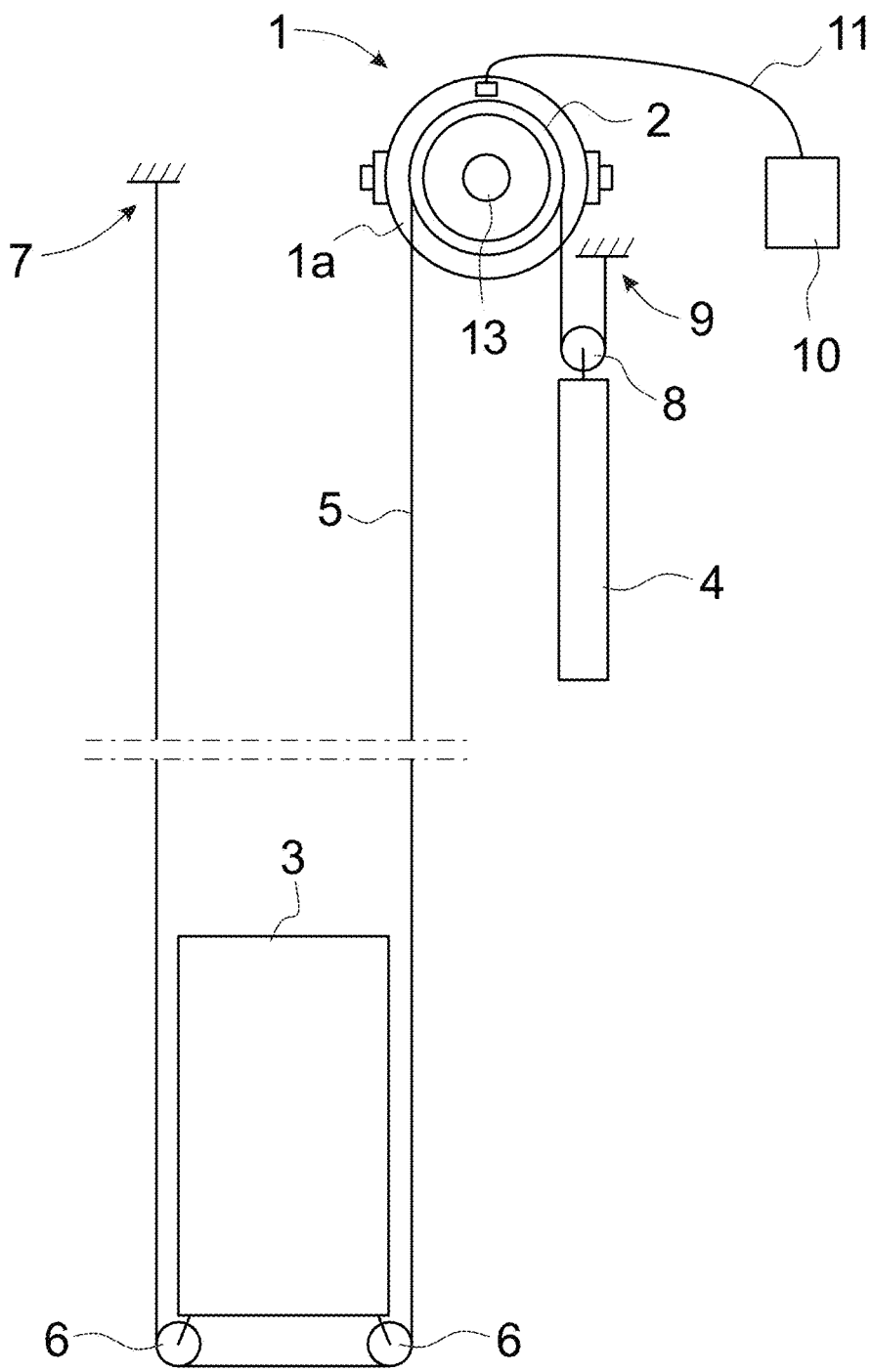
FIG. 1 presents in a simplified and diagrammatic side view an elevator with a hoisting machinery, elevator car and a counterweight according to the invention.

FIG. 1 presents in a simplified and diagrammatic side view an elevator with a hoisting machinery 1, elevator car 3 and a counterweight 4 according to the invention. The hoisting machinery 1 comprises a hoisting motor 1a that is arranged to rotate a traction sheave 2. Preferably, the hoisting motor 1a is an electric motor. The functions of the hoisting machinery 1 are controlled by an elevator control unit 10 that is connected to the hoisting machinery 1 at least via a data bus 11.

In the embodiment presented in FIG. 1 the elevator car 3 and counterweight 4 are connected to each other with a flex-ible hoisting element 5 that can comprise one or more hoisting ropes or belts. In the example embodiment the first end of the hoisting element 5 has been fastened to a fixed first fastening point 7 that is preferably placed at a top part or the elevator shaft. From the first fastening point 7 the hoisting element 5 has led downwards to go around one or more diverter pulleys 6 that are rotatably placed in the elevator car 3, for instance just below the bottom of the elevator car 3. From the elevator car 3 the hoisting element 5 has led upwards to go around the traction sheave 2 in the hoisting machinery 1. Further, from the traction sheave 2 the hoisting element 5 has again led downwards to go around one or more diverter pulleys 8 that are rotatably placed in the counterweight 4, for instance just on top of the counterweight 4. And finally, from the counterweight 4 the hoisting element 5 has led upwards to its second fixed fastening point 9 where the second end of the hoisting element 5 has been fastened.

Depending on the suspension of the elevator car 3 and the counterweight 4 that kind of elevator structure comprises several diverter pulleys 6 and 8, which all have rotary ax-les and therefore also bearings to make the rotation of the diverter pulleys 6 and 8 possible. Also, the rotary shaft 13 of the traction sheave 2 comprises bearings to make the rotation of the traction sheave 2 possible. The rotary shaft 13 is preferably also the shaft of the hoisting motor 1a. Bearings are components that wear and therefore they must be replaced in certain time intervals, preferably before the failure causes damages to other components of the elevator.

Figure 2:
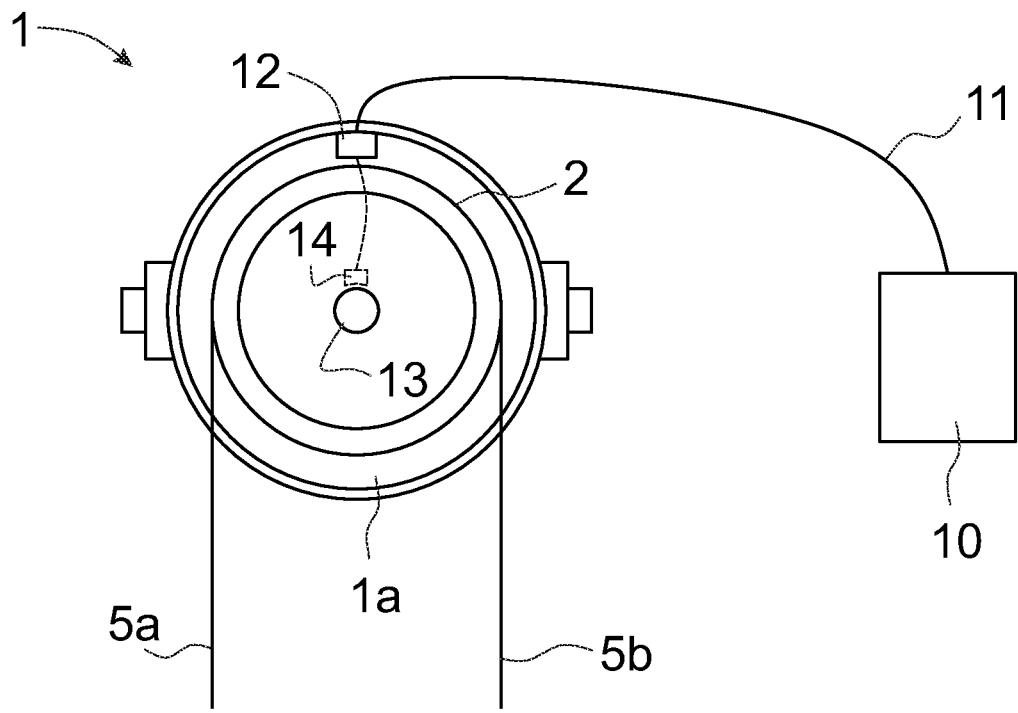
FIG. 2 presents in a simplified and diagrammatic enlarged side view a hoisting machinery and an elevator control unit according to the invention.
Figure 3:
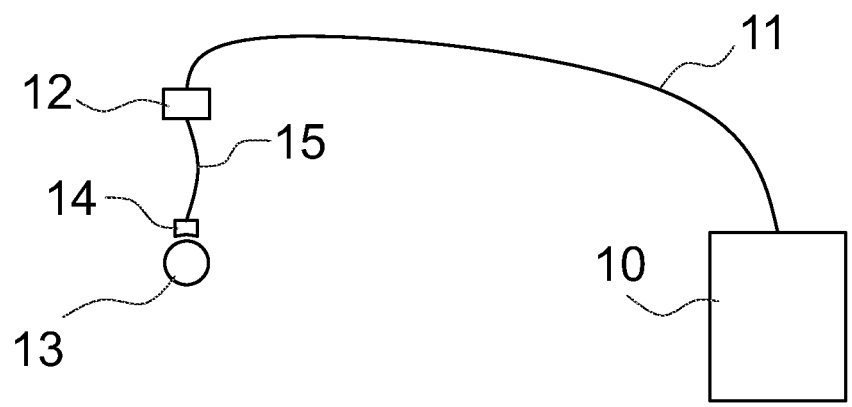
FIG. 3 presents in a simplified and diagrammatic view a connection of a bearing failure detection arrangement to the elevator control unit in the arrangement according to the invention.

FIGS. 2 and 3 present in a simplified and diagrammatic enlarged side view a hoisting machinery 1 and an elevator control unit 10 used in the arrangement according to the invention. The arrangement comprises at least a motion sensor 14 that is advantageously placed locally to the hoisting machinery 1, preferably to measure and monitor or detect the rotation of the rotary shaft 13 of the traction sheave 2 or the rotation of the traction sheave 2 itself. The motion sensor 14 acts as a motion feedback device. In addition, the arrangement comprises a signal processing unit 12 that is connected to the elevator control unit 10 via a two-way data bus 11. Preferably, the motion sensor 14 and the signal processing unit 12 have been connected together with a data cable 15 that is arranged to transmit the data measured and detected by the motion sensor 14 to the signal processing unit 12 for further processing.

Figure 4:
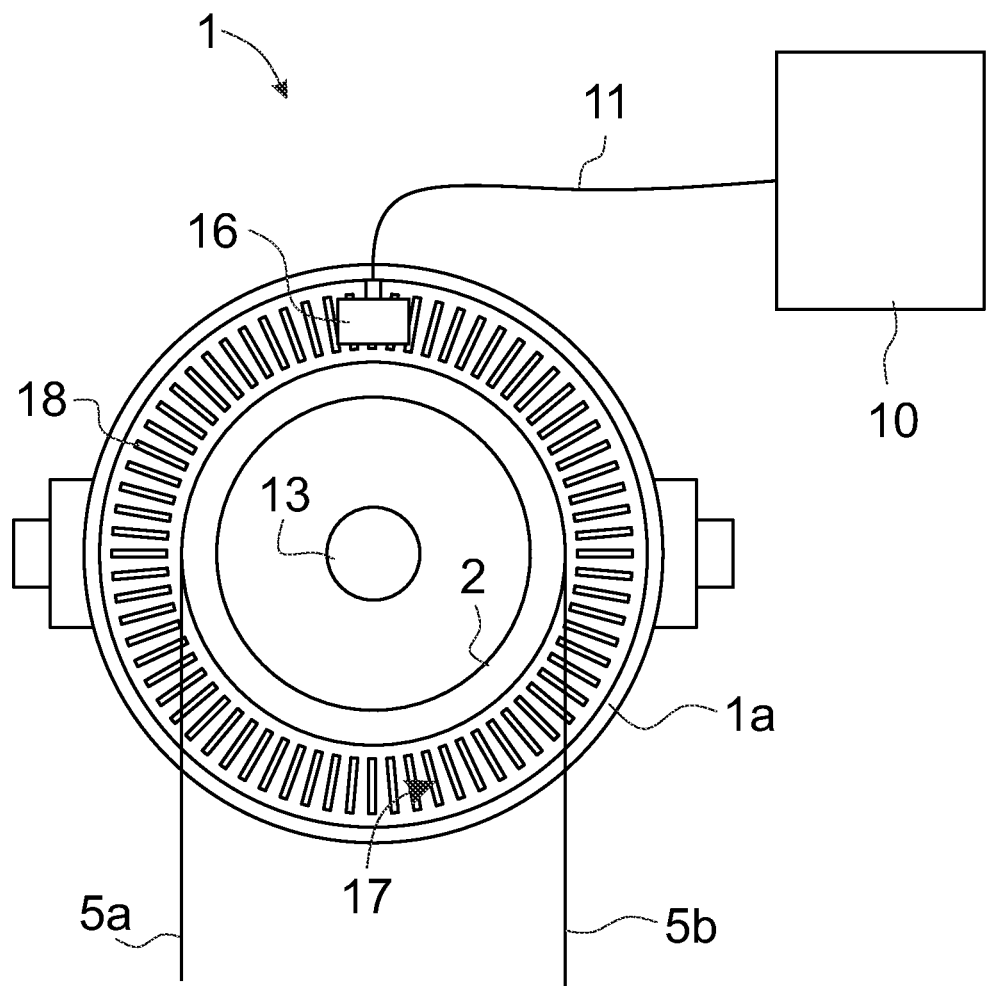
FIG. 4 presents in a simplified and diagrammatic enlarged side view a hoisting machinery and an elevator control unit according to another embodiment of the invention.

In FIGS. 2 and 4 a reference number 5a represents a part of the hoisting element 5 that is between the traction sheave 2 and the elevator car 3, and a reference number 5b represents a part of the hoisting element 5 that is between the traction sheave 2 and the counterweight 4.

FIG. 4 presents in a simplified and diagrammatic enlarged side view a hoisting machinery 1 and an elevator control unit 10 according to another embodiment of the invention. In this embodiment the signal processing unit 12 and the motion sensor 14 have been integrated into one entity that can be called a smart rotary encoder 16, which is further connected to the elevator control unit 10 via the data bus 11. Thus, in that case the smart rotary encoder 16 comprises the signal processing unit 12 and the motion sensor 14.

In this embodiment the rotary motion of the hoisting motor 1a is measured and detected with the help of a code ring 17 that is fastened onto the rotating circumference of the hoisting motor 1a. The code ring 17 comprises, for example, a series of short radially positioned bands 18 that are placed within an even angle from each other. The integrated smart rotary encoder 16 is placed upon the code ring 17 to recognize each passing band 18.

Bearing failures on the hoisting motor or in the rotation shaft 13 of the traction sheave 2, in the diverter pulleys 6 of the elevator car 3 and in the diverter pulleys 8 of the counterweight 4 are detected by filtering and monitoring vibration frequency signals originated from the bearings.

The signal processing unit 12 is preferably placed locally in the hoisting machinery 1, close to the motion sensor 14 or even integrated into it as mentioned above. The signal processing unit 12 comprises means for processing the signals measured and detected by the motion sensor 14 in a way that a Fourier transform is made from the measured signals and in this way calculated frequency spectrum is sent to the elevator control unit 10 for further processing. Depending on the local target either a fast Fourier transform (FFT) is performed or a discrete Fourier transform (DFT) is performed by the signal processing unit 12. Advantageously, DFT algorithm makes it possible to use real-time monitoring and detecting. Preferably, the signal processing unit 12 running a DTF monitoring algorithm is fitted directly into the motion sensor 14 as described in the embodiment of FIG. 4. In that case a maximum measuring accuracy can be achieved.

The measured detecting signals from the bearings of the elevator are received as vibration frequencies. Thanks to its local positioning in the hoisting machinery 1 the signal processing unit 12 receives always detected signals from the bearings of the rotation shaft 13 of the traction sheave 2 from the same distance. The detected vibration signal has certain known characteristics and if the signal begins to change it is easy to recognize a beginning bearing failure in the bearings of the rotation shaft 13 of the traction sheave 2.

But, for recognizing changing vibration frequencies in bearings of the diverter pulleys 6 of the elevator car 3 or the diverter pulleys 8 of the counterweight 4 is much more dif-ficult. However, this can be done by taking into account a changing spring factor of the hoisting element 5 depending on the distance of the bearings from the motion sensor 14 or the hoisting machinery 1. The closer to the motion sensor 14 the elevator car 3 or the counterweight 4 is the bigger the spring factor in the hoisting element 5 is. This means that the stiffness of the part 5a of the hoisting element 5 between the traction sheave 2 and the elevator car 3 grows bigger when the elevator car 3 approaches the traction sheave 2 and the free distance decreases. The same applies to the stiffness of the part 5b of the hoisting element 5 between the traction sheave 2 and the counterweight 4 when the counterweight 4 approaches the traction sheave 2.

The bigger the stiffness the stronger the vibration frequency that runs through the part 5a or 5b of the hoisting element 5. Thus, when the elevator car 3 or the counterweight 4 is traveling closer to the hoisting machinery 1 the vibration is increasing due to the higher spring factor in the corresponding part 5a or 5b of the hoisting element 5.

As mentioned above, the distance of the bearings of the rotary shaft 13 of the traction sheave 2 is always unchanged. Instead, the elevator car 3 is sometimes at its furthest location from the motion sensor 14 and sometimes its closest location from the motion sensor 14 and sometimes somewhere between these extreme positions. The same applies with the counterweight 4. When the elevator car 3 is at its furthest location the counterweight 4 is at its closest location from the motion sensor 14, and vice versa. The information about the location of the elevator car 3 and the counterweight 4 is continuously known by the elevator control unit 10.

The measuring and detecting of vibration signals can be made periodically or continuously. In the same way receiving the detected measuring signals to the signal processing unit 12 from the motion sensor 14 and performing Fourier transforms can be made periodically or continuously. By this way chang-es in vibration frequencies can be detected early enough, as early as just in the beginning phase.

Based on the increased vibration and the knowledge about the location of the elevator car 3 and/or the counterweight 4 the source of the bearing failure can be recognized. For instance, it is easy to determine on which side of the traction sheave 2 the source of the bearing failure is.

In general, the arrangement according to the invention is aimed to detect deviations of vibration signals of rotation-al motions of elevator components. Advantageously, vibration signals originated in the bearings of the hoisting machinery and/or diverter pulleys of the elevator car and counterweight are detected in this way. The hoisting rope or ropes of the elevator may transmit the vibrations with the devia-tion data from the vibration source to the detector or de-tectors used, for instance to motion sensors. The deviations of the vibration signal indicate even an incipient failure of a bearing. Preferably, the bearing failure detection is done as early as possible. The situations where a bearing failure clearly reduces ride comfort or even prevents the motion of the elevator car are not desirable.

Each bearing produces a vibration signal that is typical for just that bearing. For that reason, every single bearing can be recognized based on its specific vibration. With the arrangement according to the invention early signs of the commencing bearing failure is filtered from the measured and detected vibration signals. One way of filtering is the use of an applicable Fourier transform.

It is obvious to the person skilled in the art that the invention is not restricted to the examples described above but that it may be varied within the scope of the claims presented below. Thus, for instance instead of detecting bearing failures the arrangement can be used to detect noise coming from the hoisting motor which noise is not from bearing but, for instance, caused by wrong motor parameters, faulty groundings, etc.

It is also obvious to the person skilled in the art that instead of rotary motion sensor the vibrations originated from the bearings of an elevator car or a counterweight can also be detected with inductive sensors.

The invention claimed is:

1. An arrangement for detecting bearing failures in an elevator system, the elevator system comprising at least an elevator control unit, a hoisting machinery with a hoisting motor, a traction sheave on a rotary shaft, an elevator car, a counterweight and a hoisting element connected between the car and the counterweight and arranged to be moved by the a rotation of the traction sheave, said arrangement comprising:
   at least a motion sensor for detecting rotation of the hoisting motor; and
   a signal processing unit connected to the motion sensor and arranged to process vibration signals originated in bearings of the elevator system,
   the signal processing unit is configured to perform Fourier transforms on the vibration signals detected by the motion sensor, and
   wherein the motion sensor is arranged to receive vibration signals originated in bearings of diverter pulleys of the elevator car and/or in bearings of diverter pulleys of the counterweight through moving hoisting element.

2. The arrangement for detecting bearing failures in the elevator system according to claim 1, wherein the motion sensor is arranged to detect vibration signals originated in bearings of diverter pulleys of the elevator car and/or in bearings of diverter pulleys of the counterweight.

3. The arrangement for detecting bearing failures in the elevator system according to claim 1, wherein the signal processing unit is arranged to perform fast Fourier transforms (FFT) to the vibration signals detected by the motion sensor.

4. The arrangement for detecting bearing failures in the elevator system according to claim 3, further comprising a data bus between the signal processing unit and the elevator control unit.

5. The arrangement for detecting bearing failures in the elevator system according to claim 1, wherein the signal processing unit is arranged to perform discrete Fourier transforms (DFT) to the vibration signals detected by the motion sensor.

6. The arrangement for detecting bearing failures in an elevator according to claim 5, further comprising a data bus between the signal processing unit and the elevator control unit.

7. The arrangement for detecting bearing failures in the elevator system according to claim 1, further comprising a data bus between the signal processing unit and the elevator control unit.

8. The arrangement for detecting bearing failures in the elevator system according to claim 7, wherein the signal processing unit is arranged to send an output data of the Fourier transforms as a frequency spectrum to the elevator control unit via the data bus.

9. An arrangement for detecting bearing failures in an elevator system, the elevator system comprising at least an elevator control unit, a hoisting machinery with a hoisting motor, a traction sheave on a rotary shaft, an elevator car, a counterweight and a hoisting element connected between the car and the counterweight and arranged to be moved by the a rotation of the traction sheave, said arrangement comprising:

at least a motion sensor for detecting rotation of the hoisting motor; and a signal processing unit connected to the motion sensor, wherein the motion sensor and the signal processing unit are locally placed in the hoisting machinery and are arranged to identify and process vibration signals originated in bearings of the elevator system, the signal processing unit is configured to perform Fourier transforms on the vibration signals detected by the motion sensor, and wherein the motion sensor is arranged to receive vibration signals originated in bearings of diverter pulleys of the elevator car and/or in bearings of diverter pulleys of the counterweight through moving hoisting element.

10. The arrangement for detecting bearing failures in the elevator system according to claim 9, wherein the motion sensor is arranged to receive vibration signals originated in bearings of diverter pulleys of the elevator car and/or in bearings of diverter pulleys of the counterweight through the moving hoisting element.

11. The arrangement for detecting bearing failures in the elevator system according to claim 9, wherein the motion sensor is arranged to detect vibration signals originated in bearings of diverter pulleys of the elevator car and/or in bearings of diverter pulleys of the counterweight through the moving hoisting element and through a shaft of the hoisting motor.

12. The arrangement for detecting bearing failures in the elevator system according to claim 9, wherein the motion sensor is arranged to detect vibration signals originated in bearings of diverter pulleys of the elevator car and/or in bearings of diverter pulleys of the counterweight through the moving hoisting element and through a rotor of the hoisting motor.

13. The arrangement for detecting bearing failures in the elevator system according to claim 9, wherein the motion sensor is arranged to detect vibration signals originated in bearings of diverter pulleys of the elevator car and/or in bearings of diverter pulleys of the counterweight through the moving hoisting element through the traction sheave.

14. The arrangement for detecting bearing failures in the elevator system according to claim 9, wherein the motion sensor is connected to the signal processing unit with a data cable.

15. The arrangement for detecting bearing failures in the elevator system according to claim 9, wherein the motion sensor and the signal processing unit are integrated into one entity.

* * * * *